Nov. 19, 1940.　　　　M. B. EVANS　　　　2,222,022
APPARATUS FOR IDENTIFYING X-RAY FILMS
Filed Sept. 14, 1938　　　2 Sheets-Sheet 1

INVENTOR
MAYNARD B. EVANS
BY
ATTORNEY

Nov. 19, 1940. M. B. EVANS 2,222,022
APPARATUS FOR IDENTIFYING X-RAY FILMS
Filed Sept. 14, 1938 2 Sheets-Sheet 2
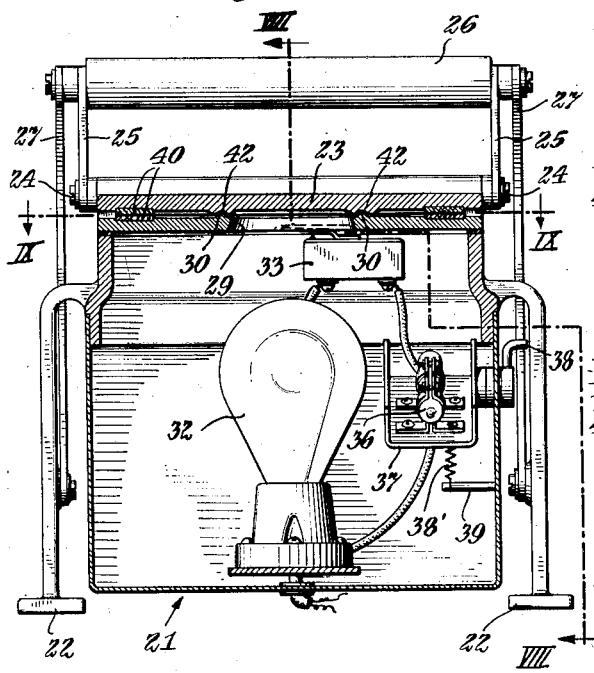
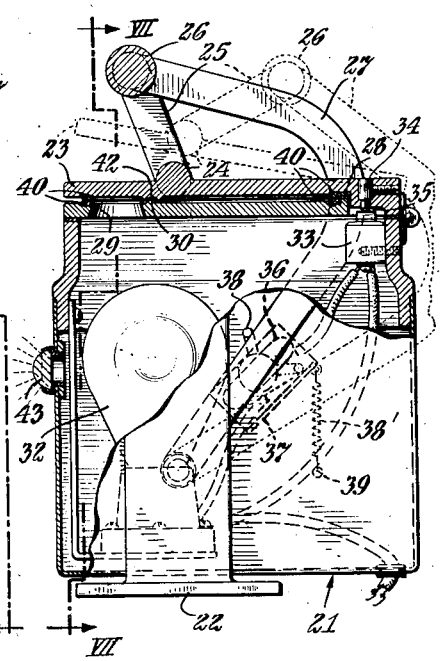
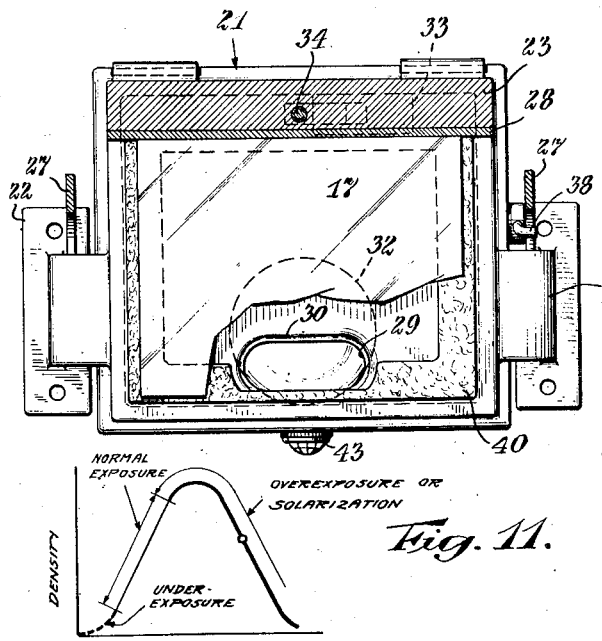
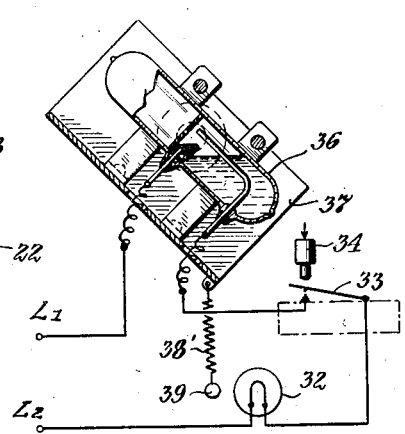
INVENTOR
MAYNARD B. EVANS
BY J. W. Greenbowe
ATTORNEY Patented Nov. 19, 1940

2,222,022

UNITED STATES PATENT OFFICE 2,222,022

APPARATUS FOR IDENTIFYING X-RAY FILMS

Maynard B. Evans, Detroit, Mich., assignor to Westinghouse X-Ray Company, Inc., Long Island City, N. Y., a corporation of Delaware Application September 14, 1938, Serial No. 229,927

2 Claims. (Cl. 95—73)

This invention relates to the taking of X-ray photographs and particularly to an apparatus for marking the X-ray films for the purpose of subsequent identification by what is known as solarizing.

At the present time the roentgenologist usually identifies the X-ray films of a patient by the utilization of file numbers placed on the film during exposure of the patient, so that such numbers appear on the developed film. However, such method of identification is inevitably subject to error and this fact is so well appreciated that X-ray films so identified are not accepted in the courts as direct positive proof of identification of any particular patient, which requires considerable corroborating and convincing testimony before acceptance of a film as being that of a patient in question.

It has also been proposed in the art to obviate the possibility of error and to make an X-ray film more positive for identification purposes by enabling a patient to identify his film by autographing so that the signature appears upon the developed film. To enable films to be identified in this manner the cassette which houses the undeveloped film is provided with a window so that the patient may impress his signature upon the film by the use of a stylus for writing upon the protective covering of the film.

Again, however, this manner of identification is by no means infallible, since upon developing the film the signature appears thereon in the usual negative form which would enable the ready transfer of a signature, or other identification marking, to another film not that of a patient whose signature appears.

It is accordingly an object of the present invention to provide an apparatus for identifying X-ray films so that a patient may autograph the film which is so treated that the transfer of the signature to any other film cannot be made without such transfer being immediately discernible.

Another object of the present invention is the provision of an apparatus for solarizing X-ray films so as to identify the film as that of a particular patient by solarizing the film after the patient has autographed the same so that the film is not only positively identified as being that of such patient, but the identifying mark or signature cannot be transferred to any other film without such transfer being immediately discernible.

Another object of the present invention is the provision of an apparatus for solarizing a portion of a photographic film bearing the signature of a patient so that the film can be readily identified as being that of a particular patient and which prevents the transfer of the autograph or other marking of the patient to another film without such flaw being immediately determined.

Still further objects of the present invention will become obvious to those skilled in the art by reference to the accompanying drawings wherein:

Fig. 7 is a sectional view of the solarizing apparatus shown in Fig. 5 and taken on the line VII—VII of Fig. 8;

Fig. 8 is a sectional view of the solarizing apparatus shown in Fig. 5 and taken on the line VIII—VIII of Fig. 7;

Fig. 9 is a sectional view of the solarizing apparatus shown in Fig. 5 and taken on the line IX—IX of Fig. 7 with a portion of the apparatus broken away to better illustrate the apparatus;

Fig. 10 is a schematic diagram of the electrical circuit of the solarizing apparatus, and Fig. 11 is a graphic illustration of the film exposure producing solarization.

Figure 1:
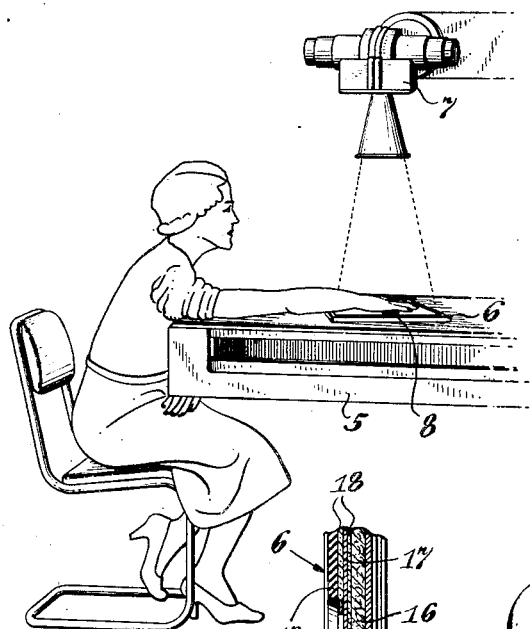
Fig. 1 is a perspective view of a patient in position for a radiographic exposure of the hand.

Referring now to the drawings in detail, in Fig. 1 a patient is shown in position for the taking of a radiographic exposure of the hand. A suitable support such as a table top 5 is shown supporting a cassette 6 containing the sensitized photographic film. The hand of the patient rests upon the cassette and an X-ray tube 7 is positioned above the hand of the patient and the cassette a suitable distance. The X-ray tube is then energized with a resulting exposure of the film within the cassette 6, as is customary in the art.

Figure 2:
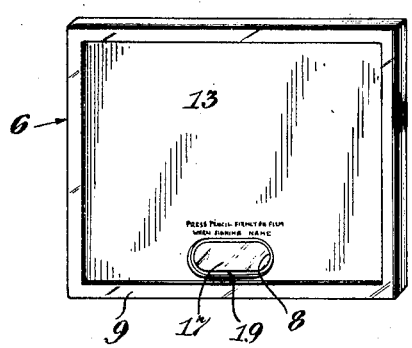
Fig. 2 is a plan view of a cassette for housing a sensitized photographic film and which is provided with a window to enable the film to be marked by the patient autographing the film.
Figure 4:
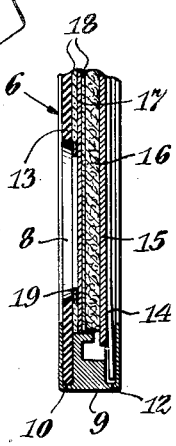
Fig. 4 is a cross-sectional view taken on the line IV—IV of Fig. 3.
Figure 3:
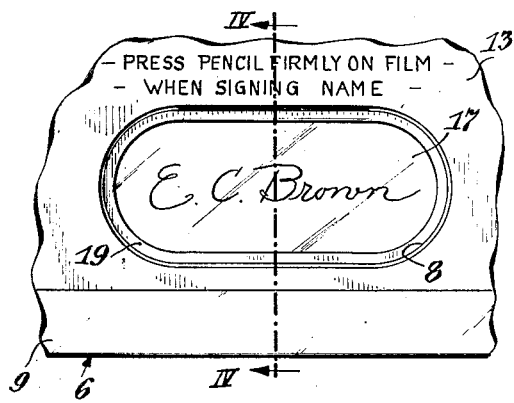
Fig. 3 is a fragmentary plan view on an enlarged scale of the cassette as shown in Fig. 2 after the patient has autographed the film.
Figure 5:
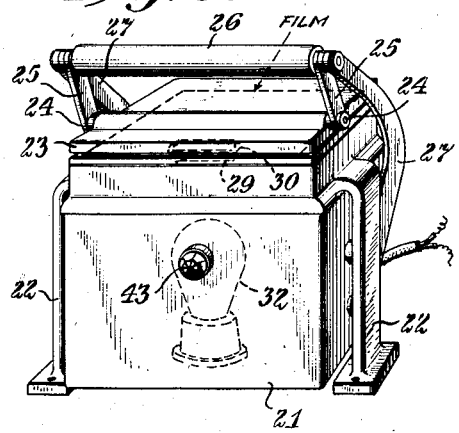
Fig. 5 is a perspective view looking at the front of a solarizing apparatus made in accordance with the present invention.
Figure 6:
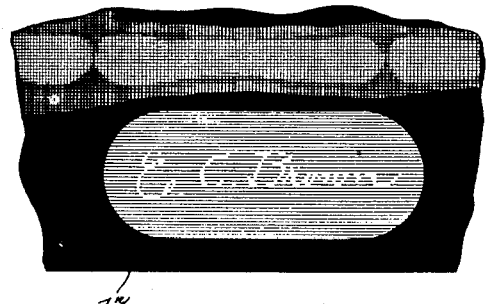
Fig. 6 is a fragmentary view of the film after solarization and developing thereof.

The cassette, as will be seen in Figs. 2, 3 and 4, is provided with an opening or window 8 which exposes a portion of the sensitized surface of the film. In order to identify the film, the patient, either before or after exposure of the film to the X-rays, inscribes some identifying mark and preferably his autograph directly upon the exposed portion of the sensitized film, either by using a stylus or a lead pencil, such as shown in Fig. 3.

The cassette 8 may be of any type well known in the art and, as shown, comprises a metallic frame 9 having slots 10 and 12 which receive the front panel 13, usually composed of a phenolic condensation product, such as Bakelite, and a spring member 14 retains the removable back plate 15 in position so that a felt cushion or the like 16 presses the sensitized film 17 firmly against the front panel 13.

Sometimes it is desirable in the taking of radiographic exposures to employ intensifying screens, such as shown at 18, between which the sensitized film is disposed. If it is desired to employ such screens, the screen next to the front panel is provided with an opening of the same contour as the opening 8 in the front panel, but of slightly smaller dimensions, and the opening thus provided in the intensifying screen may be edged with adhesive material, such as tape or the like 19, to increase pressure on the film around the opening in the intensifying screen so that light is precluded from falling on the sensitized film except over the area exposed through the opening.

After exposure of the film to X-rays and the fixing of the patient's autograph to the portion which has been exposed to daylight, the cassette, as is customary, is taken to the dark room. In Figs. 5 to 10, inclusive, a solarizing apparatus forming the subject matter of the present invention is shown, which is disposed in the dark room so that the film can be placed therein prior to development. This apparatus comprises a casing 21 which may be supported by suitable pedestals 22 and a hinged cover 23 is secured to the casing.

As will be noted more clearly from Figs. 7 and 8 the hinged cover is provided with a pair of pivots 24 to which links 25 are pivotally connected and which pivotally support a handle 26. A pair of angular link members 27 have one end thereof also pivotally connected to the handle 26 and their opposite ends are pivotally secured to the pedestals 22, as can be more readily seen in Fig. 7.

In order to raise the cover 23 of the solarizing apparatus, the handle 26 is pushed rearwardly, causing a rocking movement of the link members 27 about their pivotal connection with the pedestals 22, and at the same time there is a rocking movement of the link members 25 about their pivotal connection with the handle 26. The cover 23 is accordingly raised, as shown in dotted lines in Fig. 8. This allows the film, after removal from the cassette, to be inserted between the cover and the casing until the film contacts a ridge 28 to prevent further insertion of the film.

The top of the casing 21 is provided with an opening or window 29 surrounded by an oval ridge 30. When the film is inserted between the cover and the casing against the ridge 28, the film is thus positioned so that the portion thereof bearing the autograph of the patient, and which has been pre-exposed to daylight, aligns with the casing window 29.

Enclosed within the casing 21 is an incandescent lamp 32 of about 250 watts adapted to be energized from the customary source of electrical energy of domestic potential L1, L2 (Fig. 10).

A micro-switch, as it is termed, 33 is mounted on the underside of the casing top and the hinged cover 23 is provided with a pin or the like 34 projecting through an opening 35 in the casing top which engages the micro-switch 33 to cause closure of its contacts.

As will be noted from Fig. 10, a mercury switch 36 is also connected in series relation with the lamp and micro-switch 33. This mercury switch is mounted in a cradle support 37 pivotally secured to the side of the casing and provided with an angular arm 38 which contacts one of the link members 27, and biasing spring 38' is connected to the cradle support and to a pin 39, for rocking the cradle support to cause opening and closing of the mercury switch.

With the film positioned in the apparatus which, as before noted, aligns the autographed portion thereof with the window 29, the operator pulls the handle of the solarizer toward the front, lowering the hinged cover 23. The hinged cover, as well as the top of the casing, may be provided with a lining of felt or the like 40 to exclude light and the hinged cover 23 is also provided with a groove 42 which is engaged by the ridge 30 of the casing top to pinch the film and prevent the spread of light over the film other than the area of the window 29.

Upon closure of the hinged cover 23 the pin 34 projects through the opening 35 and closes the contacts of the micro-switch 33. Since the angular link 27 contacts the angular arm 38, the cradle support 37 is rocked, moving the mercury switch 36 from its open position, as shown in Fig. 10, to the closed position as shown in dotted lines in Fig. 8, thus placing the spring 38 under tension and closing the circuit to the lamp 32.

The lamp 32 accordingly becomes illuminated and exposes the already pre-exposed autographed portion of the film with the spread of the light being precluded by the pinching of the film, as before noted, by the ridge 30 and groove 42, and at the same time the illumination of the lamp can be observed through a "bull's-eye" 43 disposed on the front of the casing 21. The construction of the mercury switch 33 is such that it takes the mercury pool approximately seventeen seconds to flow from one end of the switch to the other, thus opening the contacts to extinguish the lamp 32 and such fact being observed by the operator through the medium of the "bull's-eye" 43, the film is ready for removal from the solarizer and development. When the handle is pushed rearwardly, as above noted, to raise the cover, the tension of the spring 38 causes the cradle support 37 to rock in the opposite direction to the position shown in Fig. 10, allowing the mercury to flow to the opposite end of the switch 36 and, while again closing its contacts during the flow, the lamp 32 nevertheless remains extinguished since the circuit is interrupted by the micro-switch 33.

During exposure of the autographed portion of the film to the intense illumination from the lamp 32, such portion is solarized, viz., a reversal in the graduation sequence in the image results from that normally obtained on the developed film and when the solarized film is developed, instead of the patient's autograph being the customary negative, the signature develops out less black than the surrounding area which, after desensitizing and washing of the crystals of the sensitized surface, leaves a transparent signature on a slightly fogged background.

This may be better appreciated by reference to

Fig. 11 wherein the abscissa represents light exposure in seconds and the ordinate, density of the developed film. From this curve it will be noted that as the time increases the density increases up to a definite point on the upward slope of the curve, as indicated by the light line, which represents the normal exposure producing the customary negative. However, by continued exposure to light the density reaches a maximum and falls off, again approaching the density of the customary negative. During the exposure there is a definite point on the curve where, due to overexposure, solarization occurs, as shown by the heavy line of the curve, and as indicated the preferable point is that between the arrows or near the peak of the curve.

By virtue of the solarization of the autographed portion of the film transfers, re-printing, etc., are prevented without such fact being immediately discernible and even if a change is attempted to the film prior to solarization, it shows up after solarization and development.

It thus becomes obvious to those skilled in the art that I have provided a method and apparatus for solarizing films so that they may be positively identified as being a negative of any given individual who autographs or otherwise marks his films.

Moreover, by solarizing the films all transfer or reprinting of the films is prevented without such transfer or reprint becoming immediately discernible. Since all doubts as to the films being that of a given patient who autographs the same are removed, such solarized films should have considerable evidentiary value in litigation, as well as definitely identifying the films even after being filed for many years.

Although I have shown and described one embodiment of the present invention, I do not desire to be limited thereto, as various other modifications of the same may be made without departing from the spirit and scope of the appended claims.

I claim:

1. A solarizing apparatus for identifying films comprising a casing provided with a window therein, a source of illumination in said casing, a cover for said casing provided with a lining to exclude extraneous light and operable to retain a pre-autographed undeveloped film in a fixed position with the autographed portion thereof in alignment with the window in said casing, means forming a border around the window in said casing, means carried by said cover and registering with said border means for said window to prevent the spread of light from said source except over the autographed area of said undeveloped film, and means operable to cause energization of said source of illumination for a preselected period of time for the purpose of solarizing the autographed portion of said undeveloped film prior to development thereof.

2. A solarizing apparatus for identifying films comprising a casing provided with a window therein, a source of illumination in said casing, a cover pivotally connected to said casing, means for moving said cover to retain a pre-autographed undeveloped film in a fixed position with the autographed portion thereof in alignment with the window in said casing, a ridge on said casing surrounding said window, a recess on said cover aligning with said ridge to crimp said undeveloped film and prevent the spread of light except over the autographed portion of said undeveloped film, and means operable upon movement of said cover to cause energization of said source of illumination for a preselected period of time for the purpose of solarizing the autographed portion of said undeveloped film by over-exposure prior to development thereof.

MAYNARD B. EVANS.